(12) United States Patent
Son (10) Patent No.: US 10,945,072 B1
(45) Date of Patent: Mar. 9, 2021

(54) METHOD FOR EXTRACTING VOICE SIGNALS OF PLURALITY OF USERS, AND TERMINAL DEVICE AND ROBOT IMPLEMENTING SAME

(71) Applicant: LG ELECTRONICS INC., Seoul (KR)

(72) Inventor: Jungkwan Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/743,027

(22) Filed: Jan. 15, 2020

(30) Foreign Application Priority Data

Sep. 10, 2019 (KR) .................. 10-2019-0112187

(51) Int. Cl.
| | |
|---|---|
| *G10K 11/16* | (2006.01) |
| *H03B 29/00* | (2006.01) |
| *H04R 3/00* | (2006.01) |
| *H04R 29/00* | (2006.01) |
| *H04R 1/08* | (2006.01) |
| *G10K 11/178* | (2006.01) |
| *G05D 1/00* | (2006.01) |
| *H04R 1/40* | (2006.01) |
| *G10L 17/00* | (2013.01) |
| *G01S 13/08* | (2006.01) |

(Continued)

(52) U.S. Cl.
CPC ........... *H04R 3/005* (2013.01); *G05D 1/0016* (2013.01); *G10K 11/17873* (2018.01); *G10L 17/00* (2013.01); *H04R 1/08* (2013.01); *H04R 1/406* (2013.01); *H04R 29/005* (2013.01); *G01S 13/08* (2013.01); *G01S 15/08* (2013.01); *G01S 17/08* (2013.01); *G05D 2201/0213* (2013.01); *G10K 2210/1282* (2013.01); *G10K 2210/3027* (2013.01); *G10K 2210/3044* (2013.01); *H04R 2499/13* (2013.01)

(58) Field of Classification Search
CPC ................... H04R 1/108; H04R 3/005; G10K 11/178773; G05D 1/0016; G10L 17/00
See application file for complete search history.

(56) References Cited

U.S. PATENT DOCUMENTS

2010/0014683 A1\* 1/2010 Maeda ............ G10K 11/17854
381/71.4
2010/0104110 A1\* 4/2010 Asao ........................ B64C 1/40
381/71.3

(Continued)

*Primary Examiner* — Simon King
(74) *Attorney, Agent, or Firm* — Ked & Associates, LLP (57) ABSTRACT

Disclosed herein are a method for extracting voice signals of a plurality of users, and a terminal device and a robot implementing the same. The robot includes a plurality of microphones respectively corresponding to a plurality of users, a memory and a processor, where the processor extracts a plurality of voice signals output by each of the plurality of users using a plurality of sound signals received by each of the plurality of microphones, and in this case, the processor reverses a phase of at least one of other sound signals received respectively by at least one of other microphones except an i-th microphone, and extracts an i-th voice signal output by an i-th user corresponding to the i-th microphone based on a i-th sound signal received by the i-th microphone and based on at least one of other sound signals, the phase of which is reversed.

18 Claims, 6 Drawing Sheets

(51) Int. Cl.
    *G01S 15/08*     (2006.01)
    *G01S 17/08*     (2006.01)

(56) References Cited

U.S. PATENT DOCUMENTS

| | | | |
|---|---|---|---|
| 2016/0063987 A1* | 3/2016 | Xu | H04R 1/1083 |
| | | | 381/71.12 |
| 2017/0200442 A1* | 7/2017 | Yamabe | G10K 11/17827 |
| 2017/0200443 A1* | 7/2017 | Kurosawa | G10K 11/17885 |
| 2017/0330550 A1* | 11/2017 | Lee | G10K 15/02 |
| 2018/0167731 A1* | 6/2018 | Ohta | B60R 11/02 |
| 2020/0001469 A1* | 1/2020 | Park | G10K 11/178 |

\* cited by examiner

METHOD FOR EXTRACTING VOICE SIGNALS OF PLURALITY OF USERS, AND TERMINAL DEVICE AND ROBOT IMPLEMENTING SAME

CROSS-REFERENCE TO RELATED APPLICATION

This application claims priority to and the benefit of Korean Patent Application No. 10-2019-0112187, filed in the Republic of Korea on, Sep. 10, 2019, the disclosure of which is incorporated herein by reference in its entirety.

BACKGROUND

1. Field of the Invention

The present disclosure relates to a method for extracting voice signals of a plurality of users, and a terminal device and a robot implementing the same.

2. Description of Related Art

Robots have been developed for industrial purposes and have played a role in automizing processes in factories. In recent years, they have been applied to a wide range of fields. Accordingly, medical robots, aerospace robots and the like have been developed including domestic robots that are used in homes. Among the robots, a robot capable of navigating autonomously is referred to as a mobile robot.

A robot can offer a variety of services to users. Specifically, it can be mounted onto a vehicle together with a display device and the like to offer various services such as navigation services, autonomous driving services, motion picture services and the like.

A user can utter voice signals to request a robot to offer specific services.

However, when two or more users are in a vehicle and they all utter voice signals to request services, a robot makes an error in voice recognition due to the two or more voice signals received. Accordingly, the robot cannot offer services effectively.

SUMMARY OF THE INVENTION

One objective of the present disclosure is to provide a method for extracting voice signals, and a terminal device and a robot implementing the same by which a plurality of voice signals uttered by a plurality of users may be accurately separated such that the terminal device and the robot converse with the plurality of users.

Another objective of the present disclosure is to provide a robot and a terminal device capable of offering services without making an error even when two or more users output voice signals for requesting services at the same time The present disclosure is not limited to the above-mentioned objectives, and other objectives and advantages of the disclosure, which are not mentioned above, can be understood from the following description and can be more apparently understood from embodiments of the present disclosure. It can be easily understood that the objectives and advantages of the present disclosure will be able to be embodied by means described in the appended claims and combinations thereof.

A robot according to an embodiment includes a plurality of microphones corresponding respectively to a plurality of users, a memory storing one or more instructions and a processor executing the one or more instructions, where the processor extracts a plurality of voice signals output by each of the plurality of users using a plurality of sound signals received by each of the plurality of microphones, and where the processor reverses a phase of at least one of other sound signals received respectively by at least one of other microphones except an i-th microphone among the plurality of microphones, and extracts an i-th voice signal output by an i-th user corresponding to the i-th microphone among the plurality of users based on a i-th sound signal received by the i-th microphone and based on at least one of other sound signals, the phase of which is reversed.

A terminal device in a vehicle according to an embodiment includes a memory storing one or more instructions and a processor executing the one or more instructions, where a plurality of users and a plurality of microphones corresponding to the plurality of users are located in an inner space of the vehicle, where the processor extracts a plurality of voice signals output by each of the plurality of users using a plurality of sound signals received by each of the plurality of microphones, and where the processor generates a noise-canceling signal using at least one of other sound signals received respectively by at least one of other microphones except an i-th microphone among the plurality of microphones, offsets an i-th sound signal, received by an i-th microphone among the plurality of microphones, and the noise-canceling signal, and extracts an i-th voice signal output by an i-th user corresponding to the i-th microphone among the plurality of users.

A method for extracting voice signals of a plurality of users according to an embodiment includes receiving a plurality of sound signals respectively by a plurality of microphones, and extracting a plurality of voice signals, output by each of the plurality of users, using the plurality of sound signals by a processor, whereby the step of extracting a plurality of voice signals includes reversing a phase of at least one of other sound signals received respectively by at least one of other microphones except an i-th microphone among the plurality of microphones, and extracting an i-th voice signal output by an i-th user corresponding to the i-th microphone among the plurality of users based on a i-th sound signal received by the i-th microphone and based on at least one of other sound signals, the phase of which is reversed.

According to the present disclosure, a terminal device and a robot are capable of conversing with a plurality of users by accurately separating a plurality of voice signals uttered by the plurality of users.

According to the present disclosure, a robot and terminal device are capable of offering services without making an error even when two or more users output voice signals for requesting services at the same time.

DETAILED DESCRIPTION

Hereinafter, embodiments of the present disclosure will be described in detail with reference to the accompanying drawings such that the present disclosure can be easily implemented by those skilled in the art. The present disclosure can be embodied in various forms and is not limited to the embodiments.

Parts which are not associated with description will be omitted in order to clearly describe the present disclosure, and the same or similar elements over the entire specification will be referred to by the same reference signs. Some embodiments of the present disclosure will be described in detail with reference to the accompanying drawings. In the drawings, the same elements will be referred to by the same reference signs as possible. In the following description, when detailed description of the relevant known configurations or functions is determined to obscure the important point of the present disclosure, the detailed description will be omitted.

Terms such as first, second, A, B, (a), and (b) can be used to describe elements of the present disclosure. These terms are merely used to distinguish one element from another element and the essence, order, sequence, number, or the like of the elements is not limited to the terms. If it is mentioned that an element is "coupled" or "connected" to another element, it should be understood that the element is directly coupled or connected to another element or still another element may "interposed" therebetween or the elements may be "coupled" or "connected" to each other with still another element interposed therebetween.

In embodying the present disclosure, elements can be segmented and described for the purpose of convenience of explanation. These elements may be embodied in one device or module, or one element may be divided and embodied into two or more devices or modules.

A robot in the present disclosure may denote a machine capable of automatically handling assignments or capable of automatically operating, using capabilities held by the robot. Specifically, the robot that recognizes environments, makes its own decisions and performs operations may be referred to as an intelligent robot.

Robots may be classified as industrial robots, medical robots, domestic robots, military robots and the like depending on specific purposes or fields.

The robot may be provided with a driving unit including an actuator or a motor to perform various physical operations such as movements of robot joints and the like. Additionally, a mobile robot includes wheels, a brake, a propeller and the like in the driving unit to navigate on the ground or in the air through the driving unit.

AI technology may be applied to the robot, and the robot may be implemented as a guide robot, a transportation robot, a cleaning robot, a wearable robot, an entertainment robot, a pet robot, an unmanned aerial robot, and the like.

The robot may include a robot control module for controlling operations, and the robot control module may denote a software module or a chip in which a software module is implemented as hardware.

The robot may acquire its state information, may detect (recognize) a surrounding environment and a surrounding object, may generate map data, may determine a moving path and a driving plan, may determine a response to user interaction or may determine an operation, using sensor information obtained from various types of sensors.

Herein, the robot may use sensor information obtained by at least one or more sensors among a LiDAR sensor, a radar sensor, and a camera sensor to determine a moving path and a driving plan.

The robot may perform the above-described operations using a learning model comprised of at least one or more artificial neural networks. For example, the robot may recognize a surrounding environment and object using the learning model, and may determine an operation using information on the recognized surrounding environment or object. The learning model may be directly learned by the robot or by an external device such as an AI server and the like.

In this case, the robot may perform operations by directly using the learning model and generating results. However, the robot may also perform operations by transmitting sensor information to an external device such as an AI server and the like and by receiving results that are generated as a result.

The robot may determine a moving path and a driving plan using at least one or more of map data, object information detected from sensor information, or object information obtained from an external device, and may drive based on the determined moving path and driving plan by controlling a driving unit.

Map data may include object identification information on various objects in a space in which the robot moves. For example, the map data may include object identification information on fixed objects such as a wall, a door and the like, and on movable objects such as a flower pot, a desk and the like. Additionally, the object identification information may include a name, a sort, a distance, a location and the like.

Further, the robot may perform operations or may perform driving by controlling the driving unit based on control/interactions of a user. In this case, the robot may obtain intention information on interactions according to operations of the user or utterance of voices of the user, may determine responses based on the obtained intention information, and may perform operations.

Artificial intelligence (AI) involves an area that studies artificial intelligence or that studies methodologies of developing artificial intelligence, and machine learning involves an area that defines a variety of problems handled in the artificial intelligence field and that studies methodologies of solving the problems. Machine learning is also defined as an algorithm for enhancing performance concerning a job through steady experience.

An artificial neural network (ANN), which is a model used for machine learning, may denote a model that is comprised of artificial neurons (nodes) forming a network through a connection of synapses and that has the ability to solve problems, as a whole. The artificial neural network may be defined by a pattern of a connection between neurons of other layers, a learning process of updating model parameters, and an activation function generating an output value.

The artificial neural network may include an input layer, an output layer, and optionally one or more hidden layers. Each layer may include one or more neurons, and the artificial neural network may include synapses connecting a neuron and a neuron. In the artificial neural network, each neuron may output input signals input through synapses, weights, and values of an activation function of biases.

A model parameter denotes a parameter determined through learning, and includes weights of connections of synapses, biases of neurons and the like. Additionally, a hyperparameter denotes a parameter that is required to be set prior to learning in a machine learning algorithm, and includes a learning rate, repetition frequency, a size of mini-batch, an initialization function and the like.

The purpose of training an artificial neural network is to determine a model parameter that minimizes a loss function. The loss function may be used as an index for determining an optimal model parameter in the process of training the artificial neural network.

Machine learning may be classified as supervised learning, unsupervised learning, and reinforcement learning based on learning methods.

Supervised learning may involve a method of training an artificial neural network in the state in which a label is given to learning data, and a label may denote the correct answer (or result values) that has to be inferred by an artificial neural network when learning data is input to the artificial neural network. Unsupervised learning may involve a method of training an artificial neural network in the state in which a label is not given to learning data. Reinforcement learning may involve a method of training an agent defined in a certain environment such that the agent chooses a behavior for maximizing a cumulative reward or the order of behaviors for maximizing a cumulative reward in each state.

Among artificial neural networks, machine learning implemented as a deep neural network (DNN) including a plurality of hidden layers is also referred to as deep learning, and deep learning is part of machine learning. Below, machine learning includes deep learning.

The above description may be applied to details that are provided hereunder in the present disclosure, and may be compensations for specifying or clarifying technical features of methods presented in the present disclosure.

Figure 1:
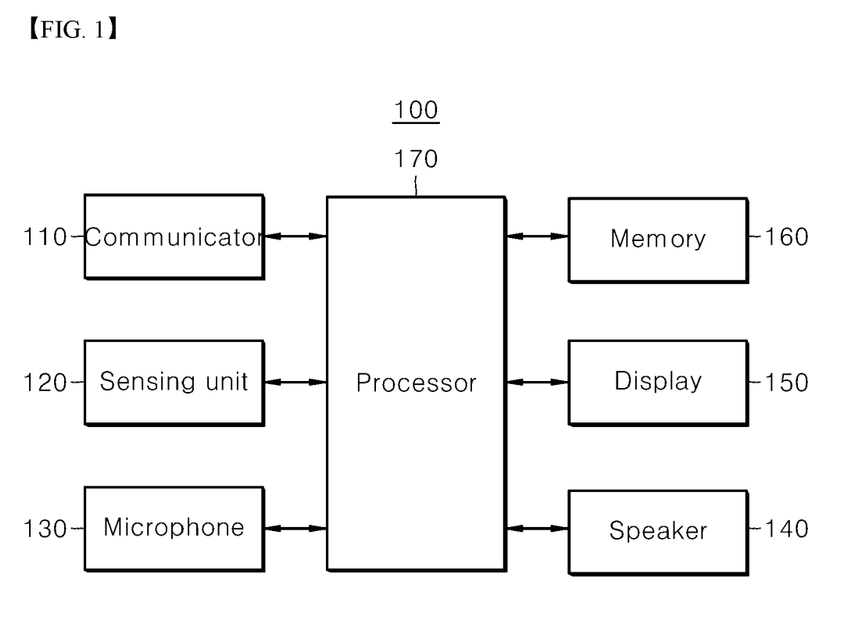
FIG. 1 is a schematic view illustrating a configuration of a robot according to an embodiment.

FIG. 1 is a schematic view illustrating a configuration of a robot according to an embodiment.

The robot 100, which is a device included in a terminal device that performs specific functions, may be placed in a vehicle.

Referring to FIG. 1, the robot 100 includes a Communicator 110, a sensing unit 120, a plurality of microphones 130, a speaker 140, a display 150, a memory 160 and a processor 170.

According to another embodiment, at least one of the sensing unit 120, the plurality of microphones 130, the speaker 140 and the display 150 may be provided in a vehicle as an additional device without being included in the robot 100.

Below, functions of each component are specifically described.

The Communicator 110 communicates with an external server, another IoT device inside a vehicle and the like. In this case, the Communicator 110 may include a mobile communication module, a short range communication module and the like.

The mobile communication module may perform communication using technical standards or communication modes for mobile communication. Herein, the technical standards or the communication modes may include Global System for Mobile Communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), 5G networks and the like.

The short range communication module for short range communication may include at least one of the technologies of Bluetooth, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB).

The sensing unit 120 acquires internal information on the robot 100, surrounding environment information on the robot 100, and the like, using various sensors.

As an example, the sensing unit 120 may include a proximity sensor, an illumination sensor, a touch sensor, an acceleration sensor, a magnetic sensor, a G-sensor, a gyroscope sensor, a motion sensor, an RGB sensor, a camera sensor, an infrared sensor (IR sensor), a finger scan sensor, an ultrasonic sensor, an optical sensor, a LiDAR sensor, a radar sensor and the like.

Specifically, the sensing unit 120 may include at least one distance measuring sensor for measuring a location of a user in a vehicle. The distance measuring sensor may include a depth sensor (e.g., an infrared sensor), an ultrasonic sensor, a LiDAR sensor, a radar sensor and the like or may include only a depth sensor.

The sensing unit 120 may be placed near a plurality of below-described microphones 130.

The plurality of microphones 130 receive voice signals of a plurality of users in the vehicle. The received voice signals of a plurality of users are delivered to the memory 160 or the processor 170.

In this case, the plurality of microphones 130 may be an array microphone in which two or more microphones are arranged in the form of an array. Accordingly, phase of two or more microphones may be changed. That is, the array microphone may be beam-formed at a specific location.

Additionally, each of the plurality of microphones 130 may correspond to the plurality of users on a one-to-one basis. That is, an i (integers of one or more)-th user among the plurality users may correspond to an i-th microphone 130 among the plurality of microphones 130.

Additionally, each of the plurality of microphones 130 may be set near a plurality of seats on which each of the plurality of users sits.

Figure 2:
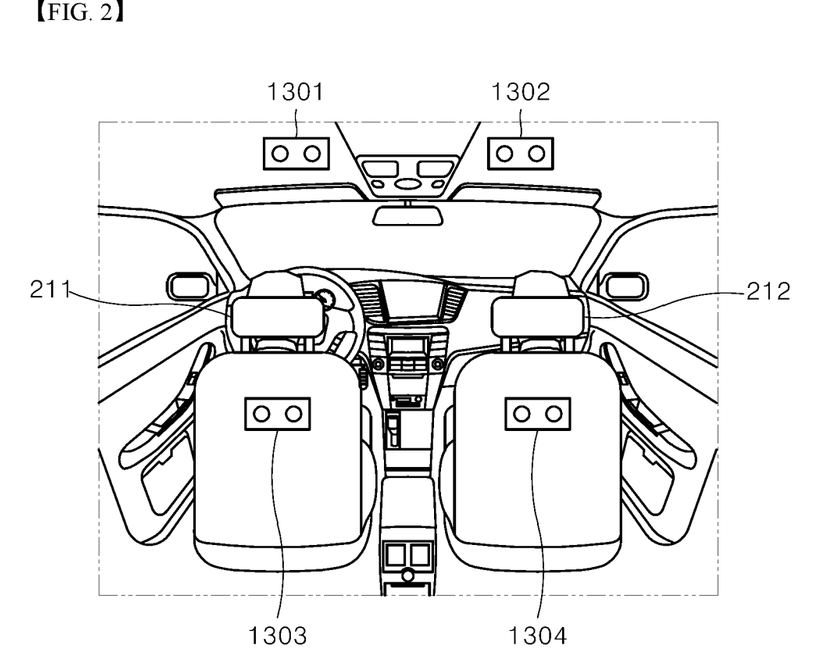
FIG. 2 is a view illustrating a location at which a plurality of microphones are arranged according to an embodiment.

FIG. 2 is a view illustrating a location at which the plurality of microphones 130 are arranged according to an embodiment.

Referring to FIG. 2, in the vehicle 200 with four seats, two microphones 130 may be placed on the ceiling of the vehicle 200, and two microphones 130 may be placed at the seats.

That is, a first microphone 1301 may be placed on the ceiling in front of the driver's seat 211, and a second microphone 1302 may be placed on the ceiling in front of the front passenger seat 212. Additionally, a third microphone 1303 may be placed on the rear surface of the driver's seat 211, and a fourth microphone 1304 may be placed on the rear surface of the front passenger seat 212.

Accordingly, each of the plurality of microphones 130 receives a voice signal uttered (output) by a corresponding user with a high intensity and receives voice signals uttered by the rest users with a low intensity.

However, the above description is provided only as an example. Each of the plurality of microphones 130 may be placed at a location where each microphone 130 may effectively receive a voice signal of a corresponding user.

The speaker 140 outputs sound signals.

The display 150 displays display services provided by the robot 100 to the plurality of users.

As an example, the display 150 may be comprised of a liquid-crystal display (LCD), a light-emitting diode (LED) display, an organic light-emitting diode (OLED) display and the like. The display 150 is a device capable of displaying an image or an image frame to the user.

The memory 160 may be volatile and/or non-volatile memory, and may store an instruction or data in relation to at least one of other components of the robot 100. Specifically, the memory 160 may store a computer program regarding a method of extracting (separating) voice signals of the plurality of users, or an instruction regarding recording media.

The processor 170 may include one or more of a central processing unit, an application processor or a communication processor. The processor 170 may perform calculation or data processing in relation to control and/or communication of at least one of other components of the robot 100. Specifically, the processor 170 may execute an instruction in relation to execution of the computer program.

A method for extracting voice signals of a plurality of users, which is performed in the robot 100, and a method for providing services by the robot 100 using the voice signals are specifically described hereunder with reference to the following drawings.

Figure 3:
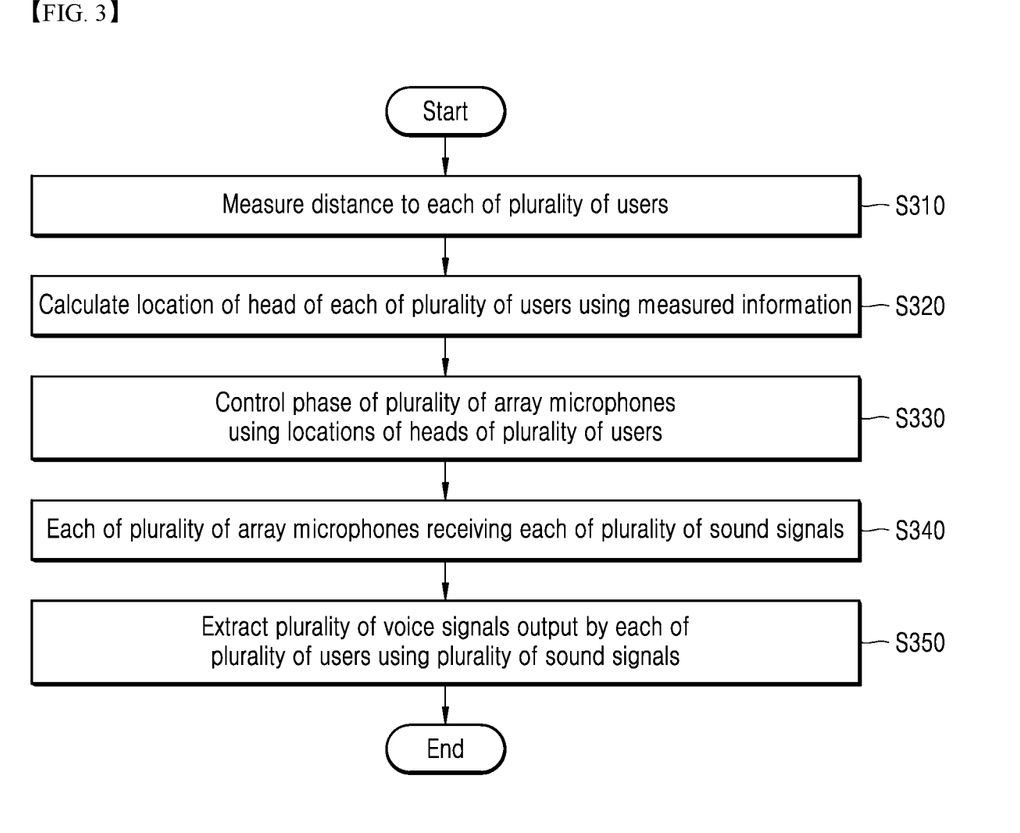
FIG. 3 is a flow chart illustrating a method of extracting voice signals of a plurality of users according to an embodiment.

FIG. 3 is a flow chart illustrating a method of extracting voice signals of a plurality of users according to an embodiment.

In this case, suppose that the plurality of users are sitting on a plurality of seats in a vehicle and that the microphone 130 is an array microphone in which two or more microphones are arranged.

Below, operations in each step are described.

First, in step 310, a sensing unit 130 measures a distance to each of the plurality of users.

According to an embodiment, the sensing unit 130 may include at least one depth sensor. In this case, measured information may be a depth image.

The depth sensor is a sensor that measures a depth of a scene, i.e., a distance between a camera and an object, and that outputs the measured distance as an image. The depth sensor acquires a depth image of a scene using the technology of Time-Of-Flight (TOF). The TOF technology involves a method of measuring a distance by measuring time taken by an infrared signal to reflect from an object in a scene that is photographed and to return. Depth information on the scene, acquired using the TOF technology, is expressed as a depth image through the process of quantization.

Next, in step 320, a processor 170 calculates the location of the head of each of the plurality of users using information measured by the sensing unit 130.

According to an embodiment, the processor 170 may calculate the location of the head of each of the plurality of users using the depth image.

Next, in step 330, the processor 170 controls phase of a plurality of array microphones 130 using the locations of the heads of the plurality of users.

According to an embodiment, the processor 170 may control the phase of an i-th array microphone 130 such that the i-th array microphone 130 may be beam-formed at the location of the head of an i-th user. The above-described control operation may be performed to all the plurality of array microphones 130 uniformly.

Beam-forming is a technique applied to wireless communication and a technique in which a plurality of antenna beams are radiated limitedly on a specific terminal. The technique is also applied to the array microphone 130 including a plurality of microphones uniformly.

Figure 4:
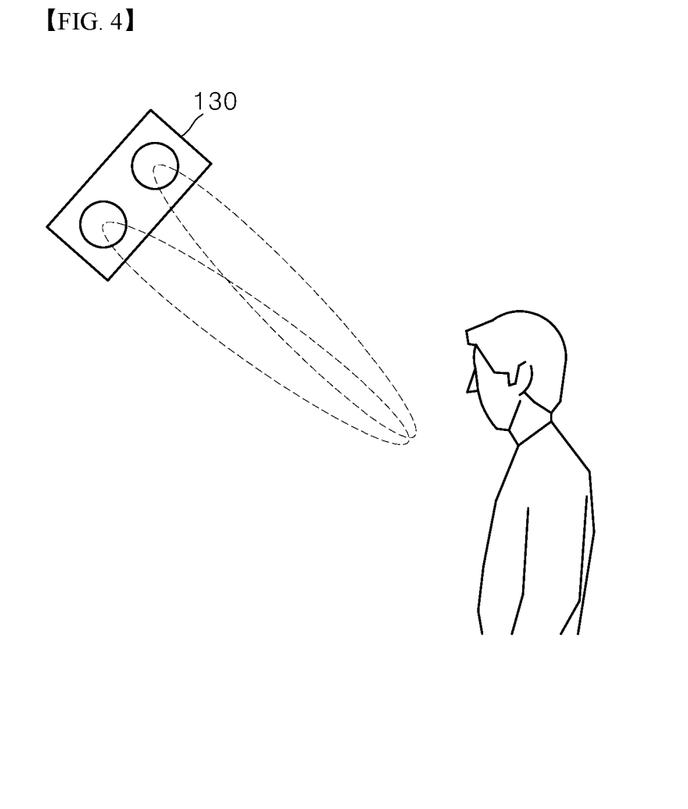
FIG. 4 is a view illustrating an example in which a single microphone array performs beam-forming at the location of the head of a single user according to an embodiment.

FIG. 4 is a view illustrating an example in which a single microphone array 130 performs beam-forming at the location of the head of a single user.

That is, steps 310 to 330 are performed such that the microphone 103 may efficiently receive voice signals uttered by a person. That is, the processor 170 calculates the location of the head of a user outputting voice signals and beam-forms the micro array at the calculated location of the head of the user because the voice signals are output by the mouth of the user.

Then in step 340, each of the plurality of array microphones 130, the phase of which is controlled, receives each of the plurality of sound signals.

In this case, each of the sound signals includes voice signals of two or more users who make utterances, among the plurality of users.

As an example, an i-th array microphone 130 receives an i-th sound signal. The i-th sound signal includes a voice signal uttered by an i-th user and a voice signal of at least one of the rest users except the i-th user. In this case, the voice signal of the i-th user has the highest intensity, and the voice signal of at least one of the rest users has a low intensity.

The above-describe example may be applied to all the plurality of array microphones 130 uniformly.

Next, in step 350, the processor 170 extracts the plurality of voice signals output by each of the plurality of users using the plurality sound signals received by each of the plurality of array microphones 130.

As described above, when two or more users among the plurality of users utter voice signals, the robot 100 may make an error in voice recognition due to two or more voice signals received, and may not offer services effectively. Accordingly, by separating voice signals of two or more users, the processor 170 may prevent an error in voice recognition, and the robot 100 may offer services effectively.

According to an embodiment, the processor 170 may separate or extract two or more voice signals using noise-canceling techniques.

Figure 5:
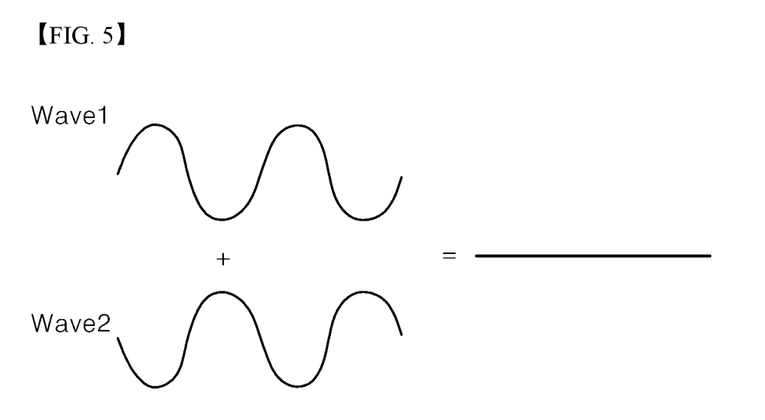
FIG. 5 is a view describing the concept of noise-cancelation.

FIG. 5 is a view describing the concept of noise-cancelation.

Noise-cancelation is a technique that is generally used for an ear bud or a headphone. Referring to FIG. 5, an external microphone receives an external noise (Wave 1), and the processor generates a sound wave (Wave 2) opposite to the received external noise to offset the external noise (Wave 1) and the opposite sound wave (Wave 2), and removes the noise.

Figure 6:
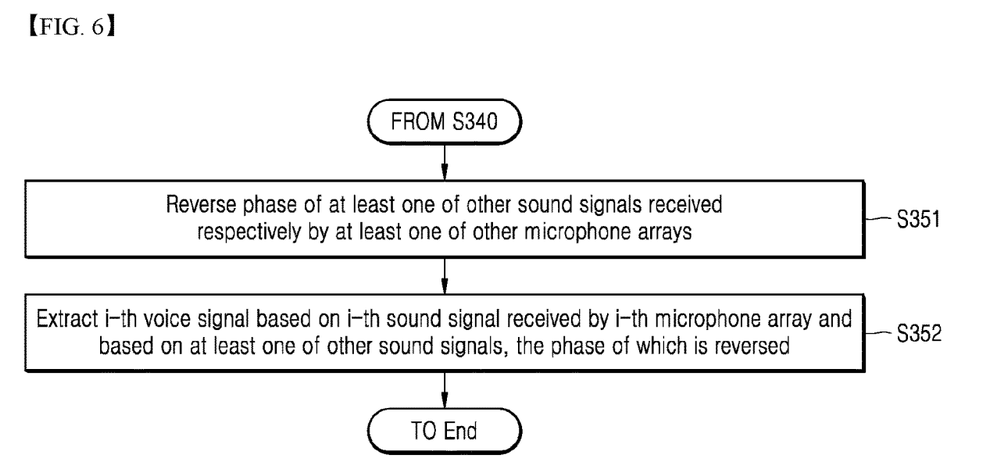
FIG. 6 is a view describing a specific process of step S350 in FIG. 3.

FIG. 6 is a view describing a specific process of step 350 in FIG. 3.

With reference to FIG. 6, extracting an i-th voice signal uttered by an i-th user is described. Description provided hereunder may be applied to extraction of two or more voice signals uttered by two or more users uniformly.

In step 351, the processor 170 reverses the phase of at least one of other sound signals received respectively by at least one of other microphone arrays 130 except an i-th microphone array 130.

The at least one of other sound signals, the phase of which is reversed, corresponds to a noise-canceling signal. That is, the processor 170 generates a noise-canceling signal using at least one of other sound signals received respectively by at least one of other array microphones 130.

In step 352, the processor 170 extracts an i-th voice signal corresponding to an i-th microphone array 130, based on an i-th sound signal received by the i-th microphone array 130 and based on at least one of other sound signals, the phase of which is reversed.

That is, the processor 170 extracts the i-th voice signal output by the i-th user by offsetting the i-th sound signal, received by the i-th microphone array 130, and the noise-canceling signal.

In short, the processor 170 treats at least one of other sound signals except a specific sound signal as a noise signal of the specific sound signal. That is, the processor 170 may extract the specific sound signal by performing calculation to offset the specific sound signal against at least one of other sound signals in which the phase is reversed. Accordingly, the processor 170 may extract voice signals uttered by a plurality of users accurately without an additional device.

Additionally, the processor 170 provides specific services to a plurality of users based on the extracted two or more voice signals. The specific services may include navigation services, motion picture services, music services, Internet search services and the like.

According to a first embodiment, when a first voice signal requesting a first service and a second voice signal requesting a second service are extracted simultaneously at a specific point in time, the processor 170 may generate a first notification message to confirm which of the first service and the second service is required to be offered, and may control a speaker 140 such that the speaker 140 may output the first notification message.

As an example, the first voice signal requesting the first service may correspond to a voice signal of "How can I get to a restaurant." uttered by a first user sitting on the driver's seat, and the second voice signal requesting the second service may correspond to a voce signal of "Play music." uttered by a second user sitting on the passenger seat behind the driver's seat. The first voice signal and the second voice signal may be uttered by different users at the same time.

In this case, the processor 170 separates the first voice signal and the second voice signal through the above-described process, and generates a first notification message such as a message of "Which of the two services do you want?".

The generated first notification message is output through the speaker 140, any one of the plurality of users may utter a response voice signal (e.g., "Play music.") corresponding to the first notification message, and the processor 170 may offer navigation services based on the description provided with reference to FIG. 3.

According to a second embodiment, priority may be given to services for the plurality of users. When the first voice signal requesting the first service and the second voice signal requesting the second service are extracted simultaneously at a specific point in time, the processor 170 may provide a service corresponding to a voice signal uttered by a user who is given a higher priority.

Specifically, when the first user is given a higher priority than the second user, and the first voice signal is output by the first user and the second voice signal is output by the second user, the processor 170 may offer the first service corresponding to the first user who is given a higher priority.

Priority may be given in the order of a user in the driver's seat, a user in the front passenger seat, and a user in a rear passenger seat. That is, the user who is sitting in the driver's seat and drives a vehicle dominantly is given the highest priority, the user assisting with control of the vehicle and sitting in the front passenger seat is given the second highest priority, and the user in the rear passenger seat is given the lowest priority.

According to a third embodiment, when priority for offering services is given to the plurality of users, and the first voice signal requesting the first service and the second voice signal requesting the second service are extracted simultaneously at a specific point in time, the processor 170 may offer the first service and the second service in the order from the user given a higher priority to the user given a lower priority. In the case in which a service corresponding to the user given a higher priority is offered for a short period of time, the third embodiment may be applied.

As an example, suppose that the first user utters a first voice signal of "How long does it take to get to a restaurant?" and the second user utters a second voice signal of "Play music." When the first user is given a higher priority than the second user, the processor 170 may first offer a navigation service of "It will take about 15 minutes.", and then may play music.

According to a fourth embodiment, when a third user utters a third voice signal that is a first response to a message regarding a specific service, and a fourth user utters a fourth voice signal that is a second respond to the message at the same time as the third voice signal is uttered, the processor 170 may generate a second notification message for confirming which of the first response and the second response is required to be handled, and may control the speaker 140 such that the speaker 140 may output the second notification message.

As an example, when the third user utters a first response voice signal of "Yes, I do.", and the fourth user utters a second response voice signal of "No, I don't." at the same time as the first response voice signal is uttered, in response to output of a message for providing a service such as "Do you want to listen to music?", the processor 170 generates a second notification message of "Do you want to listen to music or not?".

The generated second notification message may be output through the speaker 140, any one of the plurality of users may utter a response voice signal corresponding to the second notification message, and the processor 170 may provide services based on the description provided with reference to FIG. 3.

According to a fifth embodiment, when priority for offering services is given to the plurality of users, and a third user utters a third voice signal that is a first response to a message regarding a specific service, and a fourth user utters a fourth voice signal that is a second response to the message at the same time as the third voice signal is uttered, the processor 170 may offer services in response to the voice signal output by the user who is given a higher priority among the first respond and the second response.

As an example, when in response to output of a message for providing a service of "Do you want to listen to music?", the third user utters a first response voice signal of "Yes, I do.", the fourth user utters a second response voice signal of "No, I don't." at the same time as the first response voice signal is uttered, and the third user is given a higher priority than the fourth user, the processor 170 may play music.

In short, according to the present disclosure, a plurality of voice signals uttered by a plurality of users may be accurately separated, thereby enabling the robot 100 to converse with the plurality of users. Further, even when two or more users output voice signals for requesting services at the same time, the robot may provide the services without making any error.

When all elements of the embodiments of the present disclosure are described to be combined into one element or to operate in combination, the present disclosure is not limited to the embodiments and all the elements may be selectively combined to operate within the scope of the present disclosure. All the elements may be embodied can be embodied as independent hardware pieces, respectively, or some or all of the elements may be selectively combined and may be embodied as a computer program including a program module that performs some or all functions combined into one or more hardware pieces. Codes or code segments of the computer program can be easily inferred by those skilled in the art. The computer program can be stored in a computer-readable recording medium and can be read and executed by a computer, whereby the embodiments of the present disclosure can be realized. Examples of a storage medium having stored the computer program include storage mediums such as a magnetic recording medium, an optical recording medium, and a semiconductor recording medium. The computer program for realizing the embodiments of the present disclosure includes a program module which is transmitted via an external device in real time.

While embodiments of the present disclosure have been described above, various changes or modifications can be made thereon by those skilled in the art. Accordingly, it should be understood that such changes and modifications belong to the scope of the present disclosure without departing from the scope of the present disclosure.

What is claimed is:

1. A robot, comprising:
   a plurality of microphones corresponding respectively to a plurality of users;
   a memory storing one or more instructions; and
   a processor executing the one or more instructions,
   wherein the processor extracts a plurality of voice signals output by each of the plurality of users using a plurality of sound signals received by each of the plurality of microphones, and
   wherein the processor reverses a phase of at least one of other sound signal received respectively by at least one of other microphone except an i-th microphone among the plurality of microphones, and extracts an i-th voice signal output by an i-th user corresponding to the i-th microphone among the plurality of users based on a i-th sound signal received by the i-th microphone and at least one of other sound signal, in which the phase is reversed.

2. The robot of claim 1, wherein the robot and the plurality of users are located in a vehicle, and
   each of the plurality of microphones is disposed near a plurality of seats in the vehicle.

3. The robot of claim 1, wherein each of the plurality of microphones is an array microphone, and
   the processor controls phase of the plurality of array microphones.

4. The robot of claim 3, the robot, further comprising:
   at least one distance measuring sensor measuring a distance between the plurality of users, and
   wherein the processor calculates a location of the head of each of the plurality of users using information measured by the at least one distance measuring sensor, and controls phase of the plurality of array microphones using the calculated location of the head.

5. The robot of claim 4, wherein the distance measuring sensor is a depth sensor, and the measured information is a depth image.

6. The robot of claim 4, wherein the processor controls a phase of an i-th array microphone among the plurality of array microphones such that the i-th array microphone is beam-formed at a location of the head of an i-th user among the plurality of users.

7. The robot of claim 1, the robot, further comprising:
   a speaker,
   wherein the processor provides specific services to the plurality of users, and
   when a first voice signal requesting a first service and a second voice signal requesting a second service, among the plurality of voice signals, are extracted simultaneously at a specific point in time, the processor generates a first notification message for confirming which of the first service and the second service is required to be offered, and controls the speaker such that the speaker outputs the first notification message.

8. The robot of claim 1, wherein the processor provides specific services to the plurality of users and gives priority for providing the services to the plurality of users, and
   when a first voice signal requesting a first service and a second voice signal requesting a second service, among the plurality of voice signals, are extracted simultaneously at a specific point in time, the processor provides a service corresponding to a voice signal output by a user who is given a higher priority, among the first service and the second service.

9. The robot of claim 1, wherein the processor provides specific services to the plurality of users and gives priority for providing the services to each of the plurality of users, and
   when a first voice signal requesting a first service and a second voice signal requesting a second service, among the plurality of voice signals, are extracted simultaneously at a specific point in time, the processor provides the first service and the second service in the order from a user given a higher priority to a user given a lower priority.

10. The robot of claim 1, the robot, further comprising:
    a speaker outputting a message regarding a service to provide specific services to the plurality of users,
    wherein when a third voice signal that is a first response to the message, and a fourth voice signal that is a second respond to the message, among the plurality of voice signals, are extracted simultaneously at a specific point in time, the processor generates a second notification message for confirming which of the first response and the second response is required to be handled, and controls the speaker such that the speaker outputs the second notification message.

11. The robot of claim 1, the robot, further comprising:
    a speaker outputting a message regarding a service to provide specific services to the plurality of users,
    wherein priority for providing the services is given to each of the plurality of users, and
    when a third voice signal that is a first response to the message, and a fourth voice signal that is a second respond to the message, among the plurality of voice signals, are extracted simultaneously at a specific point in time, the processor provides a service in response to a voice signal output by a user who is given a higher priority, among the first response and the second response.

12. The robot of any one of claim 8,
    wherein the robot and the plurality of users are located in a vehicle, and
    the priority is given in the order of a user in the driver's seat, a user in the front passenger seat and a user in a rear passenger seat.

13. A terminal device in a vehicle, comprising;
a memory storing one or more instructions; and
a processor executing the one or more instructions,
wherein a plurality of users and a plurality of microphones corresponding to the plurality of users are located in an inner space of the vehicle,
the processor extracts a plurality of voice signals output by each of the plurality of users using a plurality of sound signals received by each of the plurality of microphones, and
the processor generates a noise-canceling signal using at least one of other sound signals received respectively by at least one of other microphone except an i-th microphone among the plurality of microphones, offsets an i-th sound signal received by an i-th microphone among the plurality of microphones, and the noise-canceling signal, and extracts an i-th voice signal output by an i-th user corresponding to the i-th microphone among the plurality of users.

14. The terminal device of claim 13, wherein each of the plurality of microphone is an array microphone, and
the processor controls phase of the plurality of array microphones.

15. The terminal device of claim 14, the terminal device, further comprising:
at least one distance measuring sensor measuring a distance between the plurality of users, and
wherein the processor calculates a location of the head of each of the plurality of users using information measured by the at least one distance measuring sensor, and controls phase of the plurality of array microphones using the calculated location of the head.

16. The terminal device of claim 15, wherein the at least one distance measuring sensor is a depth sensor, and the measured information is a depth image.

17. The terminal device of claim 15, wherein the processor controls a phase of an i-th array microphone among the plurality of array microphones such that the i-th array microphone is beam-formed at a location of the head of an i-th user among the plurality of users.

18. A method for extracting voice signals of a plurality of users, which is performed in a device including a plurality of microphones and a processor, comprising:
receiving, by the plurality of microphones, a plurality of sound signals respectively; and
extracting, by a processor, a plurality of voice signals output by each of the plurality of users using the plurality of sound signals,
the step of extracting a plurality of voice signals, comprising:
reversing a phase of at least one of other sound signal received respectively by at least one of other microphone except an i-th microphone among the plurality of microphones; and
extracting an i-th voice signal output by an i-th user corresponding to the i-th microphone among the plurality of users based on a i-th sound signal received by the i-th microphone and at least one of other sound signal, in which the phase is reversed.

* * * * *